C. E. HAAS.
BORDER STRIP FOR WALKS, ROADS, AND THE LIKE.
APPLICATION FILED AUG. 20, 1914.
1,139,515.  Patented May 18, 1915.
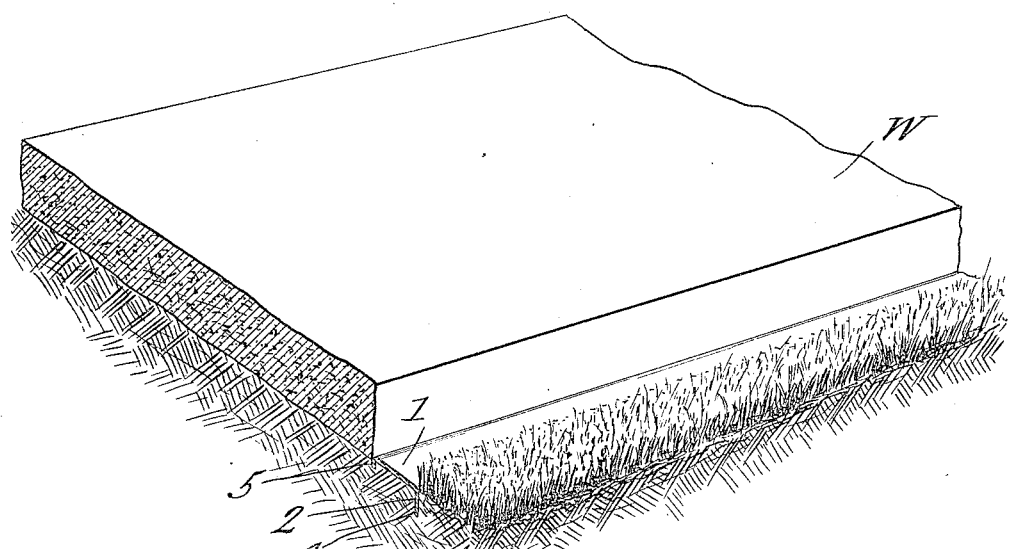
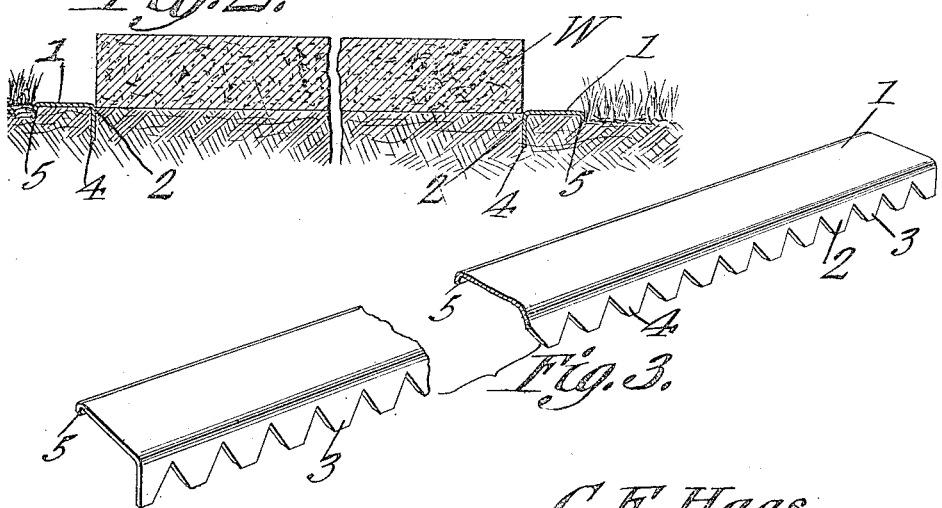
C. E. Haas, Inventor

UNITED STATES PATENT OFFICE.

CONRAD E. HAAS, OF LE MARS, IOWA.

BORDER-STRIP FOR WALKS, ROADS, AND THE LIKE.

1,139,515.

Specification of Letters Patent.    Patented May 18, 1915.

Application filed August 20, 1914.   Serial No. 857,729.

*To all whom it may concern:*

Be it known that I, CONRAD E. HAAS, a citizen of the United States, residing at Le Mars, in the county of Plymouth and State of Iowa, have invented a new and useful Border-Strip for Walks, Roads, and the like, of which the following is a specification.

This invention relates to a border strip particularly designed for use along the sides of walks, roads, and the like.

Heretofore it has been a difficult matter to trim lawns up to the edges of elevated walks, roads or the like, such an operation requiring the use of special tools and the expenditure of considerable time.

One of the objects of the present invention is to provide a border strip designed to be placed along the sides or walks, roads and the like, whereby the grass will be prevented from growing close to the walk or road and, consequently, an ordinary lawn mower can be used for trimming the grass up to the edge of the lawn.

A further object is to provide a border strip of this type which is cheap to manufacture, simple, and which can be readily placed in position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

In said drawings:—Figure 1 is a perspective view of a portion of a walk and lawn and showing the border strip is position. Fig. 2 is a transverse section through the structure shown in Fig. 1. Fig. 3 is a perspective view of a section of the border strip.

Referring to the figures by characters of reference 1 designates a strip of galvanized iron or any other suitable material which can be straight, curved, or of any other form desired.

Formed along one side of the strip 1 is a depending flange 2 having a triangular notch 3 cut thereinto whereby angular tongues 4 are provided. A narrow flange 5 is downturned along the other edge of strip 1.

In using this border strip, the notched flange 2 is placed close to the side of the raised walk W or road and is forced downwardly into the ground so that the plate 1 will rest upon the surface of the ground flush therewith, this causing the narrow flange 3 to project into the ground. Thus it will be seen that the grass, while free to grow up to the border strip 1, will not grow up to the walk or road and, consequently, an ordinary lawn mower or the like can be propelled over the lawn and it will be possible to cut all portions of the lawn without requiring the use of special trimming tools, as heretofore.

As before pointed out, it is intended to make these border strips of any desired shape so as to conform with the contour of the road or walk along which they are to be placed. Furthermore the strips can be made of any lengths desired and of any suitable material.

While the device herein described is particularly designed for use along the sides of walks, roads, etc., it is to be understood that it can also be used along walls and other structures.

What is claimed is:—

A border strip for walks and the like, including a strip having downturned longitudinal ground engaging flanges, one of said flanges being notched to facilitate its insertion into the ground, said notched flange being wider than the other flange.

In testimony that I claim the foregoing as my own, I have hereto affixed my signature in the presence of two witnesses.

CONRAD E. HAAS.

Witnesses:
  G. L. WERNLI,
  R. B. DALTON.

Copies of this patent may be obtained for five cents each, by addressing the "Commissioner of Patents, Washington, D. C."